(12) United States Patent
Dooley

(10) Patent No.: US 7,262,733 B2
(45) Date of Patent: *Aug. 28, 2007

(54) METHOD OF ESTIMATING THE LOCATION OF A DEVICE

(75) Inventor: Saul R. Dooley, Reigate (GB)

(73) Assignee: NXP B.V., Eindhoven (NL)

( * ) Notice: Subject to any disclaimer, the term of this patent is extended or adjusted under 35 U.S.C. 154(b) by 600 days.

This patent is subject to a terminal disclaimer.

(21) Appl. No.: 09/772,324

(22) Filed: Jan. 26, 2001

(65) Prior Publication Data

US 2001/0048746 A1 Dec. 6, 2001

(30) Foreign Application Priority Data

May 25, 2000 (GB) .................................. 0012641.7

(51) Int. Cl.
*G01S 3/02* (2006.01)
*H04K 1/00* (2006.01)

(52) U.S. Cl. ........................................ 342/458; 380/258

(58) Field of Classification Search ................ 713/193; 380/258; 342/458

See application file for complete search history.

(56) References Cited

U.S. PATENT DOCUMENTS

| | | | |
|---|---|---|---|
| 5,621,793 A | | 4/1997 | Ednarek et al. ............ 380/20 |
| 5,659,617 A | * | 8/1997 | Fischer ..................... 380/258 |
| 5,790,074 A | * | 8/1998 | Rangedahl et al. .... 342/357.13 |
| 5,841,396 A | | 11/1998 | Krasner ..................... 342/357 |
| 5,874,914 A | * | 2/1999 | Krasner .................. 342/357.12 |
| 6,031,490 A | * | 2/2000 | Forssen et al. ............. 342/457 |
| 6,249,252 B1 | * | 6/2001 | Dupray ....................... 342/450 |
| 6,275,705 B1 | * | 8/2001 | Drane et al. ............. 455/456.2 |
| 6,275,707 B1 | * | 8/2001 | Reed et al. ............. 455/456.3 |
| 6,332,077 B1 | * | 12/2001 | Wu et al. ................ 455/432.1 |
| 6,549,625 B1 | * | 4/2003 | Rautila et al. ............. 380/258 |
| 6,664,925 B1 | * | 12/2003 | Moore et al. ............... 342/451 |
| 2001/0055394 A1 | * | 12/2001 | Vanttinen et al. | |

FOREIGN PATENT DOCUMENTS

GB 2298099 A 8/1996

OTHER PUBLICATIONS

"Bluetooth—The Universal Radio Interface for ad hoc Wireless Connectivity", by J. Haartsen, XP 000783249.
Principles and Applications, by Elliott D. Kaplan, ISBN 0-89006-793-7.

* cited by examiner

*Primary Examiner*—Nasser Moazzami
*Assistant Examiner*—Pramila Parthasarathy

(57) ABSTRACT

Methods of providing an estimate of the location of a first device are discloses comprising the steps of determining the location of a separately housed, second device located near to the first device; providing the location of the second device to the first device; and using the location of the second device as an estimate of the location of the first device. Either the second device is arranged to perform a function based on its location other than providing its location as an estimate of the location of the first device, or the location of the second device is provided to the first device using a wireless communications link.

10 Claims, 1 Drawing Sheet

METHOD OF ESTIMATING THE LOCATION OF A DEVICE

This invention relates to a method of providing an estimate of the location of a device.

Recent progress in the field of GPS has enabled GPS receivers to be produced relatively cheaply leading to their widespread adoption and use. However, providing GPS receivers in all devices which might wish to utilise a location based service or execute a location based function may lead to many GPS receivers being required for which the cumulative costs may be prohibitive.

For example, consider a home networking environment in which is provided a mobile telephone with GPS capability for providing its location to a cellular telephone network operator in the event of an emergency call; a TV with GPS capability for providing TV access control, say as described in U.S. Pat. No. 5,621,793; and a personal computer with GPS and Internet capability for retrieving location specific information from a web site, say a local weather report. In such a home networking environment, 3 GPS receivers would be required, each returning substantially the same location.

In addition, should one GPS receiver be unable to return a location fix, for example if it is defective or can not see enough satellites, the other nearby GPS receivers are unable to provide back up or assistance.

It is therefore an object of the present invention to provide an enhanced method of providing an estimate of the location of a device which obviates or at least mitigate these problems.

In accordance with a first aspect of the present invention, there is provided a method of providing an estimate of the location of a first device comprising the steps of determining the location of a separately housed, second device located near to the first device; providing the location of the second device to the first device; and using the location of the second device as an estimate of the location of the first device, wherein the second device is arranged to peform a function based on its location other than providing its location as an estimate of the location of the first device.

The method of the first aspect of the present invention provides more efficient use of location determining means such as GPS receivers whereby one location determining means is able to service at least two devices. NB. the second device being arranged to perform a function based on its location other than providing its location as an estimate of the location of the first device is not intended to include an embodiment wherein the second device is a standalone location determining means whose sole purpose is to provide the first device with a location fix.

The location of the second device may be provided to the first device using a physical communications link such as a cable joining the first and second devices or, alternatively, using a wireless communications link such as a Bluetooth link.

In accordance with a second aspect of the present invention, there is provided a method of providing an estimate of the location of a first device comprising the steps of determining the location of a separately housed, second device to the first device; and using the location of the second device as an estimate of the location of the first device, wherein the location of the second device is provided to the first device using a wireless communications link, again such as Bluetooth.

A method in accordance with either the first or second aspects of the present invention may further comprise the step of sending a request from the first device to the second device that the second device provide its location to the first device. Where this is the case, and where the first device comprises location determining means to determine its location, the request may be sent when and preferably only when the location determining means is inoperative. This would accommodate for a defective GPS receiver or a GPS receiver which was unable to acquire the GPS signals, say because of poor reception caused by signal obscuration in an urban environment.

Also provided in accordance with the present invention is combination of first and second separately housed devices according to claims 12 to 24; and a device according to claims 25 to 34.

Yet further provided in accordance with the present invention is a method of providing an estimate of the location of a first device using second and third devices as claimed in claims 36 to 39.

The above and other features and advantages of the present invention will be apparent from the following description, by way of example, of an embodiment of a mobile cellular telephone comprising a GPS receiver for use in a cellular telephone network with reference to the accompanying drawings in which.

Figure 1:
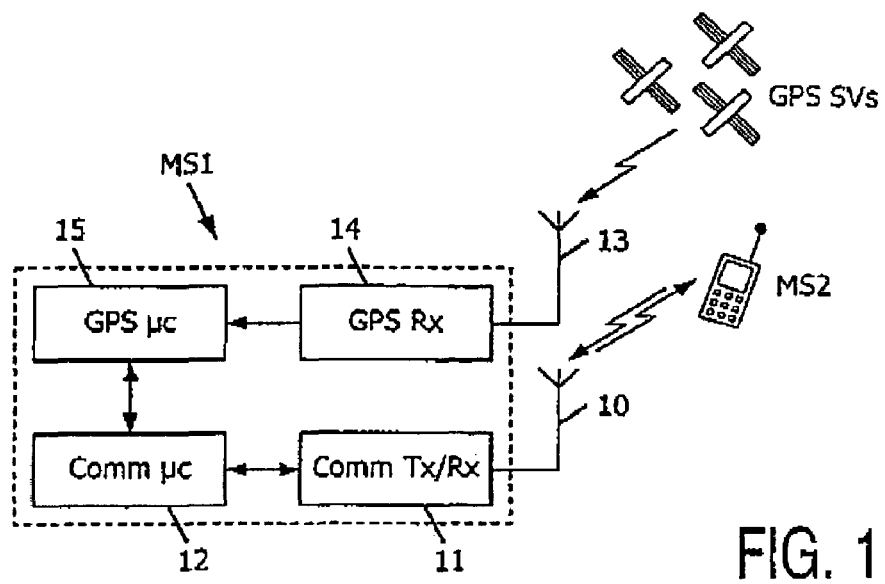
FIG. 1 shows, schematically, two mobile units MS1, MS2 according to the present invention.

Referring to FIG. 1, two substantially identical mobile units MS1, MS2 are shown, each comprising a communications transmitter (Comm Tx) and receiver (Comm Rx) 11 connected to a communications antenna 10 and controlled by a communications microprocessor (Comm $_{\mu c}$) 12 for two-way Bluetooth communication.

In addition, each mobile unit MS1, MS2 further comprises a GPS receiver (GPS Rx) 14 connected to a GPS antenna 13 and controlled by a GPS microprocessor (GPS $_{\mu c}$) 15 receiving GPS spread spectrum signals transmitted from orbiting GPS satellites. When operative, the GPS receiver 14 may receive NAVSTAR SPS GPS signal through an antenna 13 and pre-process them, typically by passive bandpass filtering in order to minimise out-of-band RF interference, preamplification, down conversion to an intermediate frequency (IF) and analog to digital conversion. The resultant, digitised IF signal remains modulated, still containing all the information from the available satellites, and is fed into a memory of the GPS microprocessor 15. The GPS signals may then be are acquired and tracked for the purpose of deriving pseudorange information from which the location of the mobile telephone can be determined using conventional navigation algorithms. Such methods for GPS signal acquisition and tracking are well known, for example, see chapter 4 (GPS satellite signal characteristics) & chapter 5 (GPS satellite signal acquisition and tracking) of GPS Principles and Applications (Editor, Kaplan) ISBN 0-89006-793-7 Artech House. The GPS microprocessor 15 may be implemented in the form a general purpose microprocessor, optionally common with the communications microprocessor 12, or a microprocessor embedded in a GPS application specific integrated circuit (ASIC).

In the event that the GPS receiver and GPS microprocessor of MS2 is unable to acquire the GPS signals, for example due to obscuration in a urban environment, the mobile MS2 is unit broadcasts a request to RF receivers in the vicinity requesting that they respond by providing their location. In this case mobile unit MS1 which is able to determine its location replies sending its location whereupon the mobile unit MS2 receives the reply and uses the location determination of mobile unit MS1 as an estimate of its own location. Mobile unit MS1 may then convey this estimate to a user through a display. Where a short range RF communications link such as Bluetooth is used, it is possible to assume a reasonable degree of accuracy unless of course the location determination of MS1 is inaccurate.

Figure 2:
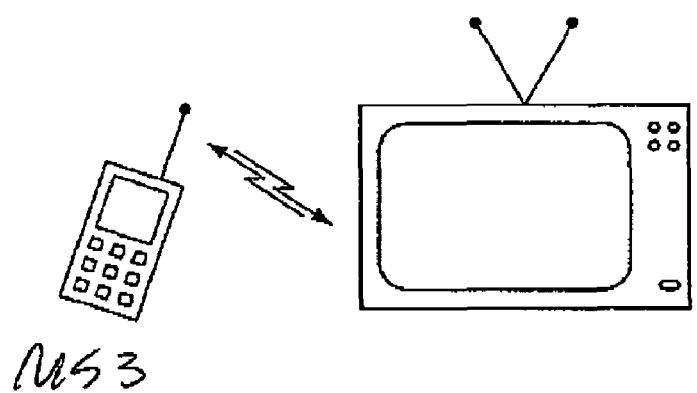
FIG. 2 shows, schematically, a mobile cellular telephone and a television according to the present invention.

A second example is shown schematically in FIG. 2 in which a GPS enabled mobile cellular telephone MS3 communicates with a television using a short range communications link, i.e. separate from the communications hardware required to communicate with base stations in a cellular telephone network. As with the mobile units of FIG. 1, a Bluetooth link would be appropriate.

The television and its integral receiver may use knowledge of its location to provide TV access control and to deter theft. For example, TV access control may be effected by receiving a location estimate from the nearby mobile telephone GPS receiver whereby only when the present location is consistent with an authorised location are the incoming video signals decrypted and displayed. However, rather than comprising its own GPS receiver, the television is provided with a wireless link to communicate with the nearby mobile cellular telephone from which it receives an estimate of its location based on the location determination of the GPS receiver in the mobile telephone.

Figure 3:
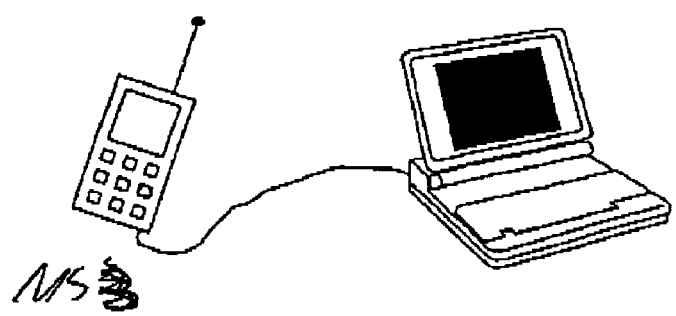
FIG. 3 shows, schematically, a mobile cellular telephone and a portable computer according to the present invention.

A third example is shown schematically in FIG. 3 in which a NAVSTAR GPS enabled mobile cellular telephone MS3 is used with a laptop computer to remotely access using the Internet. When accessing web sites which provide location based services, the laptop requests from the mobile telephone its location which is transmitted to the laptop and then supplied to a web site server, back through the mobile telephone.

In order to reduce the time to first fix, the GPS receiver of such a mobile telephone may be provided with base station assistance in order to acquire GPS signals more quickly. Such assistance may include the provision by the base station to the receiver of a precision carrier frequency reference signal for calibrating the local oscillator used in the GPS receiver; the data message for up to date satellite almanac and ephemeris data from which Doppler shift for satellites in view can be determined; and the current PRN code phase. With such assistance, it is possible to sweep only a narrowed range of frequencies and code phases in which the target PRN code is known to occupy, thereby reducing the number of code instances that need to be checked and thus reducing the time for code acquisition. Base station assistance is further described in U.S. Pat. Nos. 5,841,396 and 5,874,914 which are incorporated herein by reference.

At present GPS is most notably associated with the Navigation System with Time and Ranging (NAVSTAR) GPS, an all weather, spaced based navigation system developed and operated by the US Department of Defense, however, the general principles underlying GPS are universal and not merely limited to NAVSTAR. Accordingly, GPS refers to any positioning system comprising a plurality of radio transmitters at different locations and a receiver which determines its location based on the time of arrival of the transmissions of the radio transmitters. In so far as a telephone is concerned, this would also include base station triangulation in which timing measurements were taken by the base stations and relayed back to the mobile telephone.

The invention is equally applicable to non-GPS location determining means such a fixed land based telephone having access to its subscriber address and hence location, or a traditionally fixed device such as a central heating controller which can be told its position, say from a nearby GPS enabled mobile telephone, and then store it for future dissemination.

From a reading of the present disclosure, other modifications will be apparent to the skilled person skilled and may involve other features which are already known in the design, manufacture and use of GPS receivers and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly, whether or not it relates to the same invention as presently claimed in any claim and whether or not it mitigates any or all of the same problems as does the present invention. The applicants hereby give notice that new claims may be formulated to such features and/or combinations of such features during the prosecution of the present application or of any further application derived therefrom.

The invention claimed is:

1. A method of providing an estimate of the location of a first device comprising the steps of determining the location of a separately housed, second device located near to the first device; determining that the first device is unable to determine its location; sending a request from the first device to the second device that the second device provide its location to the first device; providing the location of the second device to the first device; and using the location of the second device as the location of the first device, wherein the location of the second device is provided to the first device using a wireless communications link.

2. A method according to claim 1 wherein the first device comprises location determining means to determine its location; and wherein the request is sent when the location determining means is inoperative.

3. A method according to claim 2 wherein the request is sent only when the location determining means is inoperative.

4. A combination of first and second separately housed devices wherein the second device comprises location determining means for determining the location of the second device and providing the location to the first device; wherein the first device is arranged to send a request to the second device that the second device provide its location to the first device; wherein the first device uses the location of the second device as its location; and wherein the location of the second device is provided to the first device using a wireless communications link.

5. A combination according to claim 4 wherein the first device comprises location determining means to determine its location; and wherein the request is sent when the location determining means is inoperative.

6. A combination according to claim 5 wherein the request is sent only when the location determining means is inoperative.

7. A combination of first and second separately housed devices according to claim 4 wherein the first and second devices are interchangeable such that they may reciprocate assistance provided by the other.

8. A device comprising a transmitter for sending a request for location information to a recipient external to the device in the event that the device is unable to determine its location; a receiver for receiving location information from that recipient; and a processor for processing received location information to generate the device's own location.

9. A device according to claim 8 further comprising location determining means to determine its location; and wherein the request is sent when the location determining means is inoperative.

10. A device according to claim 9 wherein the request is sent only when the location determining means is inoperative.

* * * * *